United States Patent
Chen et al.

(10) Patent No.: US 7,123,931 B2
(45) Date of Patent: Oct. 17, 2006

(54) SMOOTH METHOD FOR ADJUSTING DOWNLINK TRANSMITTED POWER

(75) Inventors: Xiaohua Chen, Randolph, NJ (US); Walid E. Nabhane, Mount Laurel, NJ (US); Alexandro Salvarani, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 462 days.

(21) Appl. No.: 10/385,320

(22) Filed: Mar. 10, 2003

(65) Prior Publication Data

US 2004/0209636 A1 Oct. 21, 2004

(51) Int. Cl.
*H04M 11/10* (2006.01)
*H04Q 7/20* (2006.01)

(52) U.S. Cl. .......... 455/522; 455/412.1; 370/337
(58) Field of Classification Search ............ 455/522, 455/69, 412.1, 68; 370/337
See application file for complete search history.

(56) References Cited

U.S. PATENT DOCUMENTS

2005/0143112 A1* 6/2005 Jonsson .............. 455/522

* cited by examiner

*Primary Examiner*—Lester G. Kincaid
*Assistant Examiner*—Larry Hannif-Ali

(57) ABSTRACT

An algorithm calculates a correction value to be applied to a slot in an adjustment period for power correction. For each slot, the algorithm determines whether adding a correction value in a given slot would bring the actual accumulative adjustment value closer or farther from an accumulative adjustment target value. The accumulative adjustment target value has a linear relationship with the slot number and is calculated for each slot to ensure that any corrections are evenly distributed over the adjustment period for a smooth correction. In one embodiment, the algorithm also checks the total amount of adjustment applied to the slots over a sliding adjustment window to make sure that the total amount of adjustment applied to the slots in the adjustment window do not exceed a predetermined maximum threshold.

12 Claims, 2 Drawing Sheets

SMOOTH METHOD FOR ADJUSTING DOWNLINK TRANSMITTED POWER

BACKGROUND OF THE INVENTION

1. Field of the Invention

The present invention relates to wireless communication systems.

2. Description of the Related Art

Communication systems such as wireless systems are designed to meet various demands of subscribers. Service providers continuously seek ways to improve the overall performance of the communication system. As wireless communications become more and more popular for subscribers to obtain data (i.e., email or information from the internet), communication systems must be capable of a higher throughput.

There are two directions of data flow in such systems. Communications from a base station to a mobile device are considered to flow in a downlink direction while the communications originating at the mobile device are considered to flow in an uplink direction. Most of the work in this area has focused on the downlink flow of information, which is to the mobile devices (typically from a base station, called "Node B" in the Universal Mobile Telecommunications Standard, or UMTS).

In general, a given service coverage area is divided into multiple cells, with a base station (Node B) associated with one or more cells, as shown in FIG. 1. A scheduler at the base station selects a user for transmission at a given time, and adaptive modulation and coding allows selection of an appropriate transport format (modulation and coding) for the current channel conditions seen by the user. Accordingly, in scheduling, the Node B grants permission to one or more users at a time, rather than to allow data users to transmit autonomously. Typically, this is based on an estimate of each user's radio link quality in one of the downlink and uplink.

When user equipment is moved between cell sites, the Node B in each cell site prevents dropped signals by holding the signal in both cell sites until the transfer between cell sites is completed. This process is called a "soft handover." More particularly, the Node B in the cell where the user equipment is originally located does not cut off the signal until it receives information from the Node B in the destination cell that it is maintaining the signal. Each Node B involved in the soft handover is considered part of an active set.

Each Node B also participates in power control, as it enables the user equipment to adjust its power using downlink transmission power control (TPC) commands via an inner-loop power control on the basis of uplink TPC information. Ideally, each Node B radio link involved in the soft handover receives the same TPC commands to control the transmitted power of the downlink channels (e.g., downlink data channels and downlink control channels). Due to errors in the uplink control channel radio links, however, the TPC commands received by each Node B may be different; for example, during soft handover, stronger radio links will have a lower probability of TPC bit errors than weaker radio links. If the radio link is extremely weak, the TPC bits received by the Node B will be random, breaking the inner-loop power control and potentially increasing the transmitted power of the weak link unnecessarily.

Because the inner loop at each Node B responds to the TPC commands it receives, cumulative TPC bit errors will cause the Node B transmitted power to drift substantially if the transmitted power levels of each Node B in the active set are left unsynchronized. Optimal downlink capacity is achieved if the values of the transmitted power of all the Node Bs in the active set are the same or nearly the same. If the transmitted power levels are not kept synchronized, the relative power spread between radio links increases, reducing downlink system capacity and increasing the probability of dropped signals during handover.

The UMTS standard specifies a downlink power adjustment procedure for adjusting the Node B transmitted power of the radio links in the active set. Although the UMTS standard defines the parameters, ranges and accuracy of the power adjustment procedure, the standard leaves open the specific method used to compute and apply the adjustment corrections.

There is a desire for a method that can adjust downlink transmitted power so that the values at each Node B in the active set is balanced.

SUMMARY OF THE INVENTION

The present invention is directed to an algorithm for calculating a correction value to be applied to a given slot in an adjustment period for power correction. A predetermined aggregate amount of power adjustment to be applied over the adjustment period is divided to determine an individual correction value that can be applied to single slots, each slot having a corresponding slot number, in the adjustment period. An accumulative adjustment target value having a linear relationship with the slot number is calculated for each slot. This accumulative adjustment target value for each slot ensures that any corrections are evenly distributed over the adjustment period to keep the correction smooth.

In one embodiment, the algorithm determines for each slot whether adding the correction value to a given slot would bring the actual accumulative adjustment value closer or farther from the accumulative adjustment target value. The algorithm ensures that corrections are made in a slot only if doing so would bring the accumulative adjustment value closer to the target value calculated for that particular slot. The algorithm also checks the total amount of adjustment applied to the slots over a sliding adjustment window to make sure that the total amount of adjustment applied to the slots in the adjustment window do not exceed a predetermined maximum threshold.

DETAILED DESCRIPTION

Figure 1:
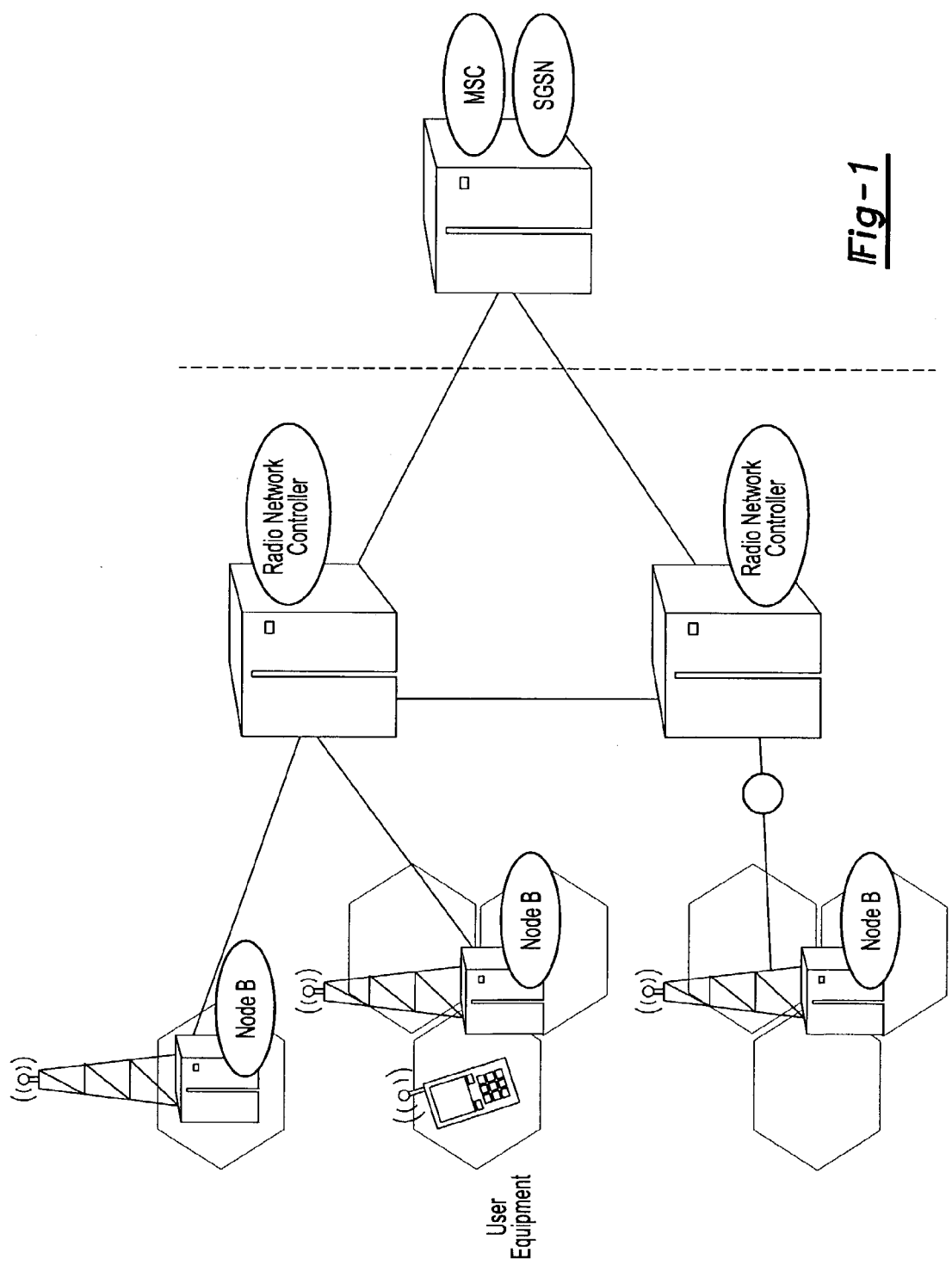
FIG. 1 is a representative diagram of cells and nodes operating one embodiment of the invention.
Figure 2:
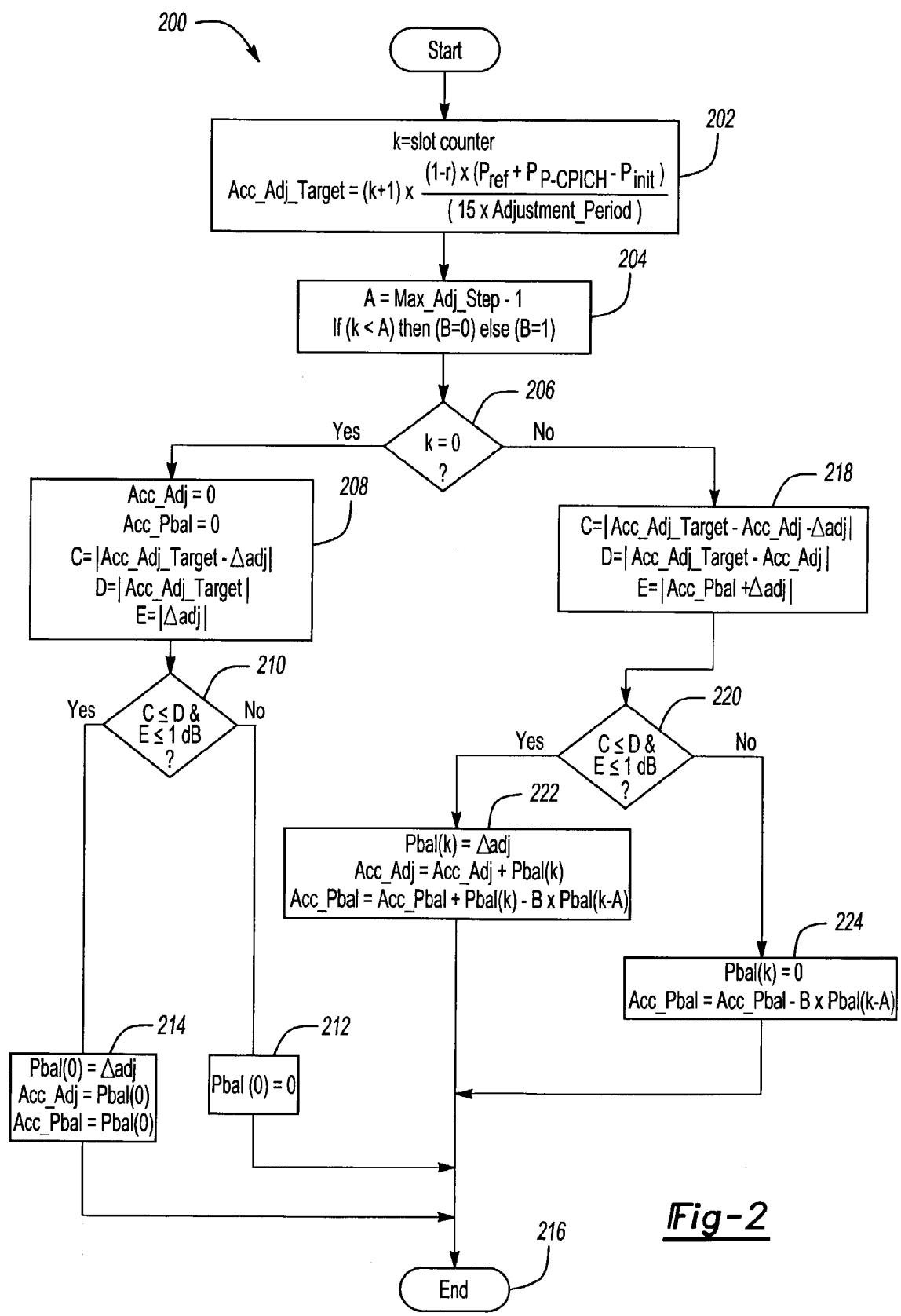
FIG. 2 is a flow diagram illustrating one embodiment of the inventive algorithm.

FIG. 2 is a flow diagram illustrating an algorithm for adjusting the downlink transmitted power to equalize the values at each Node B in an active set. For purposes of illustration only, the example described below focuses on power adjustment according to parameters defined by the UMTS standard, but the inventive algorithm can be applied to any wireless system using any standard. Parameters and formulas defined by the UMTS standard and referenced in this description are defined below in Table 1.

TABLE 1

| UMTS Parameter Name or Formula | Definition of Parameter |
|---|---|
| $\Sigma P_{bal}(k) = (1 - r)(P_{ref} + P_{P\text{-}CPICH} - P_{init})$ $k$ = Adjustment_Period | aggregate amount of power adjustment correction to be superimposed on the inner loop power control adjustments |
| $P_{bal}(k)$ | amount of power correction applied in slot k |
| Adjustment_Period | period in which a power adjustment correction $\Sigma P_{bal}(k)$ is applied (range 1 to 256 frames) |
| r | adjustment ratio defining the convergence rate used in the adjustment period |
| $P_{ref}$ | downlink reference power relative to the P-CPICH to which the power adjustment algorithm should converge to (range -35 dB to 15 dB) |
| $P_{P\text{-}CPICH}$ | primary common pilot absolute power |
| $P_{init}$ | code absolute power of the last slot of the previous adjustment period |
| Max_Adjustment_Step | maximum number of slots in which the magnitude of the power balancing correction cannot exceed 1 dB (range 1 to 10 slots) |

In this embodiment, the UMTS standard calls for a periodic procedure at a given Node B to compute the aggregate downlink power correction $\Sigma Pbal(k)$, which is the total desired power correction value, over the number of frames defined by the Adjustment_Period parameter. Generally, the aggregate downlink power correction is computed before the adjustment period starts and is applied evenly across the adjustment period by adding an applied correction value Pbal(k) to the downlink inner loop power control at each slot k. The UMTS standard also limits the sum of the adjustment corrections over an adjustment window encompassing Max_Adjustment_Step number of slots to 1 dB or less. As shown in Table 1, the adjustment window Max_Adjustment_Step has a fixed number of slots that are a subset of the slots in the adjustment period.

With the aggregate correction value $\Sigma Pbal(K)$ calculated by a given Node B being known, the inventive algorithm calculates an applied correction value Pbal(k) to be applied to a given slot k in the adjustment period. The algorithm calculates the applied correction value Pbal(k) so that the aggregate correction is distributed as uniformly as possible over the adjustment period, keeping individual applied correction values Pbal(k) small even if the aggregate correction $\Sigma Pbal(k)$ is not. By keeping the correction characteristic smooth, the inventive algorithm provides decoupling between the power adjustment procedure and the downlink inner loop, avoiding conflicts between the two mechanisms. For example, if the inner loop must raise transmitted power quickly while the adjustment algorithm wishes to lower the transmitted power, the applied correction value Pbal(k) should be smaller than the increased transmitted power adjustment in the inner loop to prevent the applied correction value Pbal(k) from cancelling out the inner loop power adjustment even if the aggregate adjustment $\Sigma Pbal(k)$ is large.

For purposes of explanation only, it is assumed in this example that the total number of slots available in an adjustment period is 15×Adjustment_Period. If the aggregate correction is $\Sigma Pbal(k)$, the amount of correction to be applied in each slot is:

$$\text{Adjust\_Target} = \quad\quad\quad\quad \text{Equation 1}$$

$$\frac{\text{total correction}}{\text{correction period}} = \frac{\left[\sum_{i \in \text{Adjustment\_Period}} P_{bal}(i)\right]}{[15 \times \text{Adjustment\_Period}]} = \frac{(1-r) \times (P_{ref} + P_{P\text{-}CPICH} - P_{init})}{[15 \times \text{Adjustment\_Period}]}$$

To obtain a smooth correction across the entire adjustment period, the algorithm also calculates an accumulative adjustment target value Acc_Adj_Target having a linear relationship with the slot number at which the correction amount is applied:

$$\text{Accumulative\_Adjust\_Target} = \text{Adjust\_Target} \times (k+1) = \quad \text{Equation 2}$$

$$\frac{(1-r) \times (P_{ref} + P_{P\text{-}CPICH} - P_{init}) \times (K+1)}{15 \times \text{Adjustment\_Period}}$$

where k=0 corresponds to the first slot in a given adjustment period. As corrections are applied to each slot in the adjustment period, the accumulative adjustment value Acc_Adj for a given slot is compared with the accumulative adjustment target value Acc_Adj_Target associated with that slot k to determine whether correction should be applied to the given slot. As k approaches the total number of slots in the Adjustment_Period, the accumulative adjustment value Acc_Adj for the adjustment period approaches the total desired power correction value.

Note that as a practical matter, the actual accumulative correction may not actually reach the target total desired power correction value $\Sigma Pbal$ at the end of the adjustment period, particularly when $\Sigma Pbal$ is large, due to quantization effects and the Max_Adjustment_Step adjustment window limitation. The algorithm will, however, ensure that the maximum possible cumulative correction is applied during the adjustment period and that the correction amount is uniformly distributed over the adjustment period.

To control the correction amount applied to a given slot, the algorithm calculates a proposed applied correction value $\Delta$adj for a given slot k, for each slot so that $$\sum_{k \in \text{Adjustment\_Period}} P_{bal}(k) = (1-r)(P_{ref} + P_{P\text{-}CPICH} - P_{init}) \quad \text{Equation 3}$$

The actual value of $\Delta$adj can be determined externally based on, for example, the speed of the mobile units, channel conditions, the amount of Doppler in the system, and other relevant parameters. FIG. 2 illustrates one possible implementation of the inventive algorithm 200 for computing an applied correction value Pbal(k) for a given slot. The algorithm 200 may be repeated, incrementing the slot counter k each time, until a correction value has been calculated for each slot in the adjustment period.

Referring to FIG. 2, the algorithm notes the slot value k and computes the accumulative adjustment target Acc_Adj_Target value for the given slot k from Equation 2 above (block 202). The algorithm also defines A=Max_Adjustment_Step–1 (block 204). The algorithm then compares the value A with the slot number k. If the slot number k is less than A (that is, if the current slot number is less than the number of slots in the sliding window Max_Adjustment_Step minus one), then the algorithm sets a value B to equal 0. Otherwise, B is set to 1 (block 204). The value B is used later in the algorithm to calculate an accumulative applied correction value Acc_Pbal.

The algorithm then checks whether the slot number k=0, indicating that the slot k is the first slot in the adjustment period (block 206). If k=0, then an accumulative adjustment value Acc_Adj, which represents the total amount of correction applied during a given adjustment period, and the accumulative applied correction value Acc_Pbal, which is used to calculate the total amount of correction applied in the sliding window Max_Adjustment_Step, are set to 0 (because there have been no previous slots in the adjustment period). Other values calculated by the algorithm include a value C, which is the absolute value of the accumulative adjustment target value Acc_Adj_Target minus the proposed applied correction value Δadj; a value D, which is the absolute value of Acc_Adj_Target; and a value E, which is the absolute value of the proposed applied correction value Δadj (block 208).

Once the algorithm defines the values for C, D, and E, the algorithm checks whether value C is less than value D and whether value D is less than or equal to 1 dB or some other maximum threshold value (block 210). In other words, the algorithm checks whether the absolute value of the difference between the accumulative adjustment target value Acc_Adj_Target and the proposed applied correction value Δadj is less than the absolute value of the accumulative adjustment target value $Acc_{13}$ Adj_Target alone. If either of these are false (that is, if the proposed applied correction value Δadj actually moves the accumulative adjustment value Acc_Adj farther away from the target value Acc_Adj_Target or if the proposed applied correction value Δadj is larger than the allowable correction value for the entire adjustment period), then the algorithm sets the applied correction value Pbal to 0 so that no correction value will be added for slot k=0.

If, however, C is less than or equal to D and if E is less than or equal to 1 dB, then the applied correction value Pbal(0) is set to be equal to the proposed applied correction value Δadj (block 214). The accumulative adjustment value Acc_Adj and the accumulative applied correction Acc_Pbal are both also set to be equal to Pbal(0). The adjustment cycle for slot k=0 then ends (block 216), priming the algorithm for calculating the applied correction value Pbal for the next slot in the adjustment period.

For slot values where k does not equal 0 (i.e., for slots other than the first slot in the adjustment period) the algorithm sets different values for C, D and E because there are correction values from previous slots to be taken into account. More particularly, if k does not equal 0, value C is the accumulative adjustment target value Acc_Adj_Target minus both the accumulative adjusted value Acc_Adj (i.e., the amount of adjustment that has already taken place in the adjustment period) and the proposed applied correction value Δadj; value D is set to be equal to the accumulative adjustment target value Acc_Adj_Target minus the accumulative adjustment value Acc_Adj; and value E is set to be the sum of the accumulative applied correction value Acc_Pbal and the proposed adjustment value Δadj (block 218). Note that value E reflects the total amount of adjustment applied so far in the sliding window.

The algorithm then checks whether value C is less than value D and whether value E is less than or equal to 1 dB or some other maximum permissible correction value (block 220). If value C is greater than D, this indicates that the proposed applied correction value Δadj would move the accumulative adjustment value Acc_Adj away from, rather than toward, the target value Acc_Adj_Target for that slot. Further, the algorithm checks whether the proposed applied correction value will cause the total amount correction applied in the sliding window so far to go above the maximum total correction amount for the sliding window (1 dB in this example).

If the criteria in block 220 are both true, then the algorithm sets the applied correction value Pbal(k) for the current slot k to be equal to the proposed applied correction value Δadj (block 222). The algorithm also updates the accumulative adjustment value Acc_Adj by adding the applied correction value Pbal(k) for the slot to the previous value for Acc_Adj. The accumulative applied correction value Acc_Pbal is also updated to reflect the applied correction value Pbal(k) for slot k by adding the applied correction value Pbal(k) of the current slot k to the previous accumulative applied correction value Acc_Pbal and then subtracting the applied correction value used in the first slot of the Max_Adjustment_Step window; in other words, the Acc_Pbal value treats the current slot k as the last slot in the sliding window in determining whether the total correction amount in the adjustment window has reached its maximum. This recalculation slides the adjustment window so that the current slot k is always the last slot in the adjustment window. Note that if B is set equal to zero (block 204), which would occur if the total number of slots considered so far is less than the number of slots in the adjustment window, then the subtraction step is not needed.

If either of the criteria in block 220 are false (that is, if the proposed applied correction value Δadj actually moves the accumulative adjustment value Acc_Adj farther away from the target value for the slot Acc_Adj_Target, as shown by comparing values C and D, or if the proposed applied correction value Δadj is larger than the allowable correction value for the entire adjustment window, as indicated by value E), then the algorithm sets the applied correction value Pbal to 0 so that no correction value will be added for slot k=0 (block 224). The accumulative adjustment value Acc_Adj is updated in a similar manner as in block 220 except that no value for Pbal(k) is subtracted from the accumulative applied correction value Acc_Pbal because Pbal(k) is equal to 0 in this case. The algorithm then finishes (block 216) and readies itself for determining the correction value for the next slot.

Table 2 below illustrates one example of an application of the smooth adjustment method according to one embodiment of the invention. In this example, the sliding Max_Adjustment_Step window is set at 10 slots (that is, any 10 slots cannot have a total amount exceeding 1 dB) and the accumulative applied correction value ΣPbal is 2.3 dB. The proposed adjustment value Δadj for each slot is selected to be 0.2 dB, and the adjustment period is two frames, which corresponds to 30 slots in this example. From Equation 1, the Adjust_Target for each slot is calculated to be in this example:

$$\text{Adjust\_Target} = \frac{2.3 \text{ dB}}{(15 \times 2)} = 0.077 \text{ dB} \qquad \text{Equation 4}$$

TABLE 2

| Slot Number k | Acc_Adjust_Target | Acc_Adj [dB] | $P_{bal}(k)$ [dB] | $Acc\_P_{bal}$ $\sum_{i=max(0,k-9)}^{k} P_{bal}(i)$ [dB] |
|---|---|---|---|---|
| 0 | 0.077 | 0 | 0 | 0 |
| 1 | 0.153 | 0.2 | 0.2 | 0.2 |
| 2 | 0.230 | 0.2 | 0 | 0.2 |
| 3 | 0.307 | 0.4 | 0.2 | 0.4 |
| 4 | 0.383 | 0.4 | 0 | 0.4 |
| 5 | 0.460 | 0.4 | 0 | 0.4 |
| 6 | 0.537 | 0.6 | 0.2 | 0.6 |
| 7 | 0.613 | 0.6 | 0 | 0.6 |
| 8 | 0.690 | 0.8 | 0 | 0.6 |
| 9 | 0.767 | 0.8 | 0.2 | 0.8 |
| 10 | 0.843 | 1 | 0 | 0.8 |
| 11 | 0.920 | 1 | 0.2 | 0.8 |
| 12 | 0.997 | 1 | 0 | 0.8 |
| 13 | 1.073 | 1.2 | 0 | 0.6 |
| 14 | 1.150 | 1.2 | 0.2 | 0.8 |
| 15 | 1.227 | 1.4 | 0 | 0.8 |
| 16 | 1.303 | 1.4 | 0.2 | 0.8 |
| 17 | 1.380 | 1.4 | 0 | 0.8 |
| 18 | 1.457 | 1.6 | 0 | 0.8 |
| 19 | 1.533 | 1.6 | 0.2 | 0.8 |
| 20 | 1.610 | 1.6 | 0 | 0.8 |
| 21 | 1.687 | 1.6 | 0 | 0.6 |
| 22 | 1.763 | 1.8 | 0.2 | 0.8 |
| 23 | 1.840 | 1.8 | 0 | 0.8 |
| 24 | 1.917 | 2 | 0.2 | 0.8 |
| 25 | 1.993 | 2 | 0 | 0.8 |
| 26 | 2.070 | 2 | 0 | 0.6 |
| 27 | 2.147 | 2.2 | 0.2 | 0.8 |
| 28 | 2.223 | 2.2 | 0 | 0.8 |
| 29 | 2.300 | 2.4 | 0.2 | 0.8 |

The formula for the accumulative adjustment target Acc_Adjust_Target value is set so that it increases linearly based on the slot number; in this case, Acc_Adjust_Target=0.077 dB×(k+1). Table 2 shows the applied correction value Pbal(k) for each slot and the accumulative applied correction value. As shown in Table 2, the applied correction values Pbal(k) for the slots are distributed evenly over the adjustment period, ensuring that the accumulative applied correction increases in a roughly linear fashion; no applied correction value Pbal(k) is added to the slot unless the result would bring the accumulative adjustment value Acc_Adj closer to the Acc_Adjust_Target value. Also note that the accumulative applied correction value Acc_Pbal for the adjustment window is kept below 1 dB; in this example, because the proposed applied correction value Δadj is 0.2 dB, the highest that Acc_Pbal will reach is 0.8. Because the adjustment window slides forward as each new slot is examined, the accumulative applied correction value Acc_Pbal will fluctuate and may drop below the maximum threshold. The adjustment process continues until the accumulative adjustment value Acc_Adj reaches the total desired power correction for the adjustment period, or at least a maximum possible cumulative correction amount.

By calculating an accumulative adjustment target value for each individual slot in the adjustment period, the inventive algorithm tracks any power imbalances among the Node Bs in the active set quickly, but keeps the size of each applied correction small to prevent overriding downlink inner loop power control commands. Further, by distributing the corrections evenly over the adjustment period, the inventive algorithm keeps individual corrections small, even when the total accumulative adjustment is relatively large, and provides de-coupling between the power adjustment procedure and any inner loop adjustments.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, this method, system and portions thereof and of the described method and system may be implemented in different locations, such as network elements, the wireless unit, the base station, a base station controller, a mobile switching center and/or radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

We claim:

1. A method for adjusting transmitted power in a channel over an adjustment period having a plurality of slots, each slot having an associated slot number, comprising: determining an accumulative adjustment target value for each slot number, wherein the accumulative adjustment target value is linearly proportional to the slot number; calculating an applied correction value to be added to a given slot; adding the applied correction value to the given slot if adding the applied correction value to an accumulative adjustment value brings the accumulative adjustment value toward the accumulative adjustment target value; and transmitting using a power level corresponding to the included added applied correction value.

2. The method of claim 1, wherein the step of determining an accumulative adjustment target value comprises:
    dividing a total correction value by the number of slots in the adjustment period to determine an adjustment target value corresponding to the amount of correction to be applied to each slot in the adjustment period; and
    multiplying the adjustment target value by a value corresponding to each slot number to obtain the accumulative adjustment target value for each slot number.

3. The method of claim 1, further comprising:
    defining a proposed applied correction value;
    calculating a first reference value by subtracting the accumulative adjustment value and the proposed applied correction value from the accumulative adjustment target value;
    calculating a second reference value by subtracting the accumulative adjustment value from the accumulative adjustment target value; and
    conducting the adding step if the first reference value is less than or equal to the second reference value.

4. The method of claim 1, further comprising adding the applied correction value to the accumulative adjustment value to update the accumulative adjustment value.

5. The method of claim 1, further comprising the steps of:
    defining an accumulative applied correction value as a sum of applied correction values over a selected number of slots in the adjustment period;
    adding the applied correction value to the given slot if adding the applied correction value to the accumulative adjustment value brings the accumulative adjustment value toward the accumulative adjustment target value and if adding the applied correction value to the accumulative applied correction value keeps the accumulative applied correction value below a maximum threshold;
    ignoring the applied correction value for the given slot if adding the applied correction value to the accumulative adjustment value brings the accumulative adjustment value away from the accumulative adjustment target value; and
    ignoring the applied correction value for the given slot if adding the applied correction value to the accumulative applied correction value sends the accumulative applied correction value above the maximum threshold.

6. The method of claim 5, further comprising adding the applied correction value to the accumulative adjustment value to update the accumulative adjustment value.

7. The method of claim 5, wherein the selected number of slots used to determine the accumulative applied correction value are consecutive slots in an adjustment window having a fixed number of slots.

8. The method of claim 7, wherein the adjustment window has a first slot and a last slot, and wherein the adjustment window is set as a sliding window such that the given slot is set to be the last slot in the adjustment window.

9. The method of claim 8, further comprising:
    adding the applied correction value of the last slot in the adjustment window to the accumulative applied correction value; and
    subtracting the applied correction value of a first slot in the adjustment window, wherein the adding and subtracting steps update the accumulative applied correction value.

10. A method for adjusting transmitted power in a wireless downlink channel over an adjustment period having a plurality of slots, each slot having an associated slot number, comprising: determining an accumulative adjustment target value for each slot number, wherein the accumulative adjustment target value is linearly proportional to the slot number, and wherein the accumulative adjustment target value is calculated by dividing a total correction value by the number of slots in the adjustment period to determine an adjustment target value corresponding to the amount of correction to be applied to each slot in the adjustment period; multiplying the adjustment target value by a value corresponding to each slot number to obtain the accumulative adjustment target value for each slot number; defining a proposed applied correction value; calculating a first reference value by subtracting the accumulative adjustment value and the proposed applied correction value from the accumulative adjustment target value; calculating a second reference value by subtracting the accumulative adjustment value from the accumulative adjustment target value; adding the proposed applied correction value if the first reference value is less than or equal to the second reference value, indicating that the applied correction value will bring the accumulative adjustment value toward the accumulative adjustment target value; adding the applied correction value to the accumulative adjustment value to update the accumulative adjustment value; and transmitting using a power level corresponding to the included added applied correction value.

11. The method of claim 10, further comprising the steps of:
    defining an accumulative applied correction value as a sum of the applied correction values in consecutive slots in an adjustment window having a fixed number of slots fewer than the number of slots in the adjustment period;
    adding the applied correction value to the given slot if adding the applied correction value to the accumulative adjustment value brings the accumulative adjustment value toward the accumulative adjustment target value and if adding the applied correction value to the accumulative applied correction value keeps the accumulative applied correction value below a maximum threshold;
    ignoring the applied correction value for the given slot if adding the applied correction value to the accumulative adjustment value brings the accumulative adjustment value away from the accumulative adjustment target value; and
    ignoring the applied correction value for the given slot if adding the applied correction value to the accumulative applied correction value sends the accumulative applied correction value above the maximum threshold.

12. The method of claim 11, wherein the adjustment window has a first slot and a last slot, and wherein the adjustment window is set as a sliding window such that the given slot is set to be the last slot in the adjustment window by:
    adding the applied correction value of the last slot in the adjustment window to the accumulative applied correction value; and subtracting the applied correction value of a first slot in the adjustment window, wherein the adding and subtracting steps update the accumulative applied correction value.

* * * * *